Inventor
Hans Brun
By
Watson, Cole, Grindle & Watson
Attys.

United States Patent Office

3,498,110
Patented Mar. 3, 1970

3,498,110
METHOD AND APPARATUS FOR MEASURING THE GAS AND VAPOR PERMEABILITY OF FILMS
Hans Brun, Oslo, Norway, assignor to Sentralinstitutt for industriell forskning Forskningsveian, Oslo, Norway
Filed July 20, 1967, Ser. No. 654,754
Claims priority, application Norway, July 21, 1966, 164,020
Int. Cl. G01m 3/00
U.S. Cl. 73—38     11 Claims

ABSTRACT OF THE DISCLOSURE

A method and apparatus for measuring the gas and vapor permeability of films by placing the film in a test cell divided by the film in two chambers of which one chamber contains a test gas and the other another gas. The diffusion rate of the test gas through the film in a measuring period that is started with no test gas in the second chamber, is measured by passing substantially all the gas present in the second chamber at the end of the measuring period to a gas chromatograph. The second chamber is connected with a supply conduit for carrier gas to the gas chromatograph through a switch valve. A further valve is connected into both the carrier gas supply conduit and a test gas conduit to permit the transfer of certain amounts of test gas into the carrier gas conduit to calibrate the gas chromatograph.

---

Figure 1:
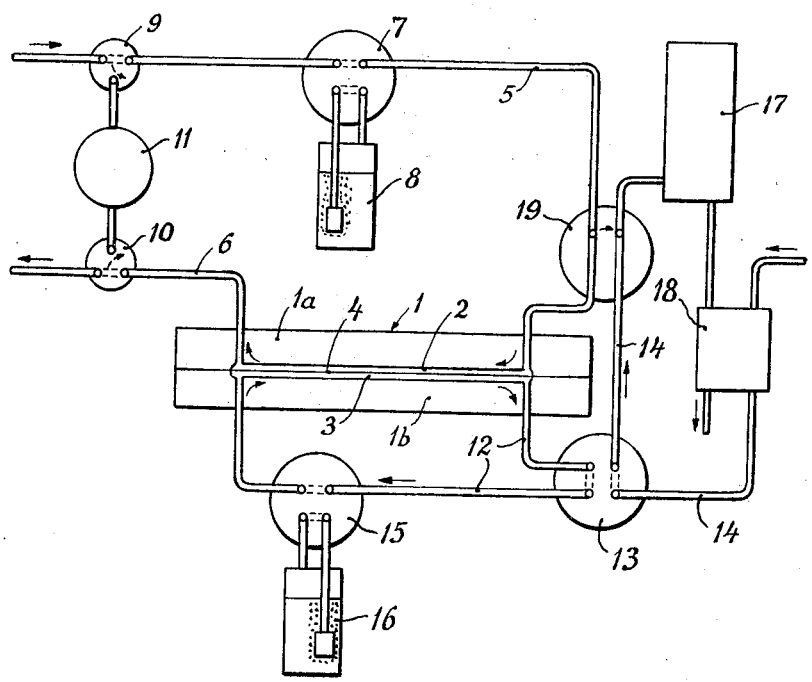

The present invention relates to a method and an apparatus for measuring the gas and vapor permeability of films, in which the film divides a test cell into a first chamber containing a test gas and a second chamber originally containing another gas and in which the amount of test gas diffused through the film and mixed with said other gas in the second chamber is measured by determining the concentration of test gas in the second chamber by means of a gas chromatograph.

A gas or a vapor is transferred through a film of organic material having no holes, by dissolution of the gas or the vapor in the film material at one surface, diffusion of the gas or vapor through the film due to the concentration gradient, and evaporation of the gas or vapor from the opposite surface at which the concentration and thus the partial pressure are low. After some time a steady-state transfer is reached and the gas then diffuses through the film at a constant rate as long as the test conditions are the same.

The permeability of the film can be determined in several ways, but the methods used are usually variations of one of the following basic methods:

(1) The pressure-increase method. While the test gas is supplied to the face of the film, a vacuum is provided on the opposite side and the increase in pressure at the rear of the film is measured.

(2) The volume-increase method. In this method an increased pressure of the test gas at the face of the film is used and the increase in volume at the rear is measured.

(3) The concentration-increase method or the isostatic principle. In this method the test gas at the face and another gas at the rear have the same total pressure and the concentration of test gas in said other gas is measured.

The method of the application is based upon the isostatic principle and the concentration of test gas in said other gas is determined by means of a gas chromatograph, the gas mixture being first fractionated into separate compounds whereafter signals from a detector indicate the amount of the various separate components on a recorder.

In known methods for determining the concentration by means of a gas chromatograph, a small amount or a sample of the gas volume present in the second chamber at the time when the concentration is to be measured, is withdrawn from the second chamber and carried to the gas chromatograph, that is by means of a microsyringe. To avoid changes in the total pressure in the second chamber a corresponding amount of said other gas may be injected into the chamber before each sample is withdrawn. However, the samples must be kept relatively small compared to the total volume of the second chamber in order that the concentration in this chamber is not significantly influenced when the samples are withdrawn. Thereby it becomes possible to carry out the diffusion continuously to the same amount of said other gas, the second chamber thus acquiring a steadily increasing concentration of test gas, the said concentration being determined at suitable intervals. However, the method also implies that the measuring of the permeability takes a rather long time, as relatively large amounts of test gas must diffuse through the film in order to provide in the sample transferred to the gas chromatograph by means of a syringe or otherwise, an amount of test gas sufficient to produce a recordable effect on the gas chromatograph. Further the previously used methods and apparatus have not permitted a sufficiently accurate determination of calibration values for the gas chromatograph, which is relatively sensitive to changes in the ambient conditions and which therefore should be calibrated in direct connection with the analysis of the withdrawn sample.

In accordance with the present invention the sensitivity of the gas chromatograph is utilized to achieve very short measuring periods compared with the time necessary for analysis of the film, the method permitting the determination of the permeability by measuring the gas transfer at certain times. Further, calibration values may be accurately determined in direct connection with the measurements.

According to the invention the entire gas volume present in the second chamber at the time when the concentration is to be measured is flushed from the second chamber and carried to the gas chromatograph by means of a stream of a gas which is identical to said other gas originally present in the second chamber, said stream of gas serving as a carrier gas for the chromatographic analysis.

The apparatus according to the invention is characterized in that a supply pipe for carrier gas to the chromatograph is adapted to be connected to an inlet to the second chamber for flushing this chamber so that the entire gas volume present in the scond chamber at the time when the concentration is to be measured is passed through an outlet and through the gas chromatograph.

In order to ensure a good flushing or sweeping of the second chamber this chamber has a narrow and elongated shape, the inlet and the outlet being positioned at the ends of the chamber. The apparatus is further characterized by a conduit which is connected to the second chamber so as to constitute together therewith a loop in which the said other gas and the permeated test gas may circulate. A valve may be provided in the loop for interruption thereof and provide a series-connection of the loop into the carrier gas supply pipe leading to the gas chromatograph. Further a gas washer may selectively be connected into the loop.

An important feature of the apparatus according to the invention is that the apparatus comprises a dosing valve which can transfer a certain amount of test gas from a test gas supply pipe to the carrier gas supply pipe for calibrating the gas chromatograph. The dosing valve comprises two passages inserted in or connected into the carrier gas supply pipe and the test gas supply pipe respectively and a disc extends across both passages and has an aperture which can be aligned with one of the passages so that the gas flowing in the pipe into which this passage is connected, will pass through said aperture, said disc being displaceable between seals for aligning the aperture with the other passage, whereby the gas contained in the aperture is transferred from one passage to the other.

Figure 3:
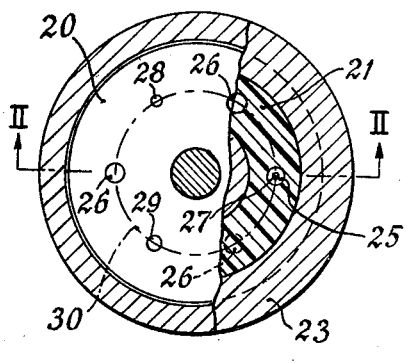
Figure 2:
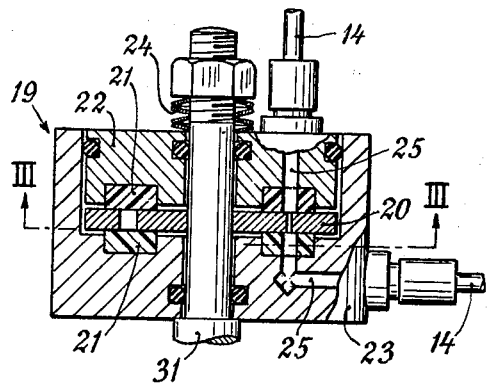

The invention will now be further described reference being had to the accompanying drawings, in which FIG. 1 is a diagrammatic view showing of the structure and the functioning of the apparatus according to the invention, FIG. 2 is a sectional view of a dosing valve for transferring a certain amount of gas from the test gas supply pipe to the carrier gas supply pipe, and taken on line, II—II of FIG. 3 in the direction of the arrows, FIG. 3 is a cross-sectional view of the dosing valve taken on the line III—III in FIG. 2.

The test cell 1 consists of two substantially identical halves 1a and 1b of rectangular shape, the halves having for example, a length of 250 mm., a width of 40 mm. and a height of 25 mm. The halves 1a and 1b are made of stainless steel. Alternatively the halves may be made of another material which is non-corrosive with respect to the gases employed, that is chromium-plated brass. In each of the opposed faces of the halves 1a and 1b there is provided an elongated recess having an approximate length of 210 mm., width of 13 mm. and a depth of 2 mm., the recess being rounded at both ends. Around the recess 2 in the upper half there is provided an O-ring gasket (not shown) in a groove, and the mouth of the recess is covered by a fine-meshed acid-proof wire cloth (not shown). The surface of the lower half 1b around the recess 3 therein is buffed. The film 4 to be tested is inserted between the two halves, which are clamped together by means of a simple spring-loaded clamp which for simplicity is not shown in the drawing. When testing thick or uneven films the lower half 1b may be replaced by a half having a gasket surrounding the recess in the same manner as for the upper half. The chamber defined by the recess 2 in the upper half above the film 4 defines a chamber for test gas which is supplied to the chamber through a pipe 5 at one end and removed from the chamber through a pipe 6 at the other end. Into the test gas supply pipe 5 there may be connected a four-way valve 7 which may be positioned so that before the gas enters the chamber 2 it must pass a gas humidifier or gas washer 8 for humidifying the test gas flowing above the film 4. In the test gas supply pipe 5 between the valve 7 and the chamber 2 there is also provided a valve 19 which will be described in more detail By means of three-way valves 9 and 10 there may also be provided a closed circuit for the test gas, which may be circulated from the pipe 6 back to the pipe 5 by a pump 11.

The two extremities of a conduit 12 are connected to the two opposite ends of the chamber 3 below the film 4, the conduit 12 thus defining together with the chamber 3 a loop in which the gas originally present in the chamber 3 as well as the test gas which has diffused through the film 4, may circulate. In the conduit 12 there is inserted a four-way valve 13 which short-circuits a supply pipe 14 for carrier gas to a gas chromatograph 17. The four-way valve 13 may also be placed in a position in which the conduit 12 and the chamber 3 are series-connected into the carrier gas supply pipe 14. In the conduit 12 between the four-way valve 13 nad the chamber 3 there is inserted a further four-way valve 15 permitting the gas in the conduit 12 to circulate through a gas washer 16 for controlling the humidity thereof. From the four-way valve 13 the carrier gas continues through the carrier gas supply pipe 14 to the column 17 of the gas chromatograph and further to the detector 18 of the gas chromatograph. The carrier gas supply pipe 14 on its way from the four-way valve 13 to the column 17 passes the valve 19, the function and design of which will be described in detail.

In testing a film the following procedure is followed. The film sample is clamped between the halves 1a and 1b and a test gas is passed through the chamber 2 above the film 4 by means of the pipes 5 and 6. Initially, the four-way valve 13 may be in the position in which the chamber 3 is series-connected into the carrier gas supply pipe 14. When the gas transmission is to be determined, the valve 13 is switched to the position illustrated in the drawings, in which the carrier gas supply pipe 14 is short-circuited and the chamber 3 closed. The period required to obtain a measurable amount of test gas in the chamber 3 that is the measuring period, is very short and more especially between 1 and 30 minutes according to the type of test gas and the film to be tested. These measuring periods are substantially shorter than the measuring periods required in the previously known methods, the measuring periods according to the method of the invention having a length of approximately as many minutes as the previous methods require hours. At the end of the measuring period the four-way valve 13 is switched back to the position in which the chamber 3 is series-connected into the carrier gas supply pipe 14 so that the carrier gas in this pipe will flush the chamber 3 and carry all the test gas permeated through the film 4 to the gas chromatograph 17 and the detector 18 thereof. The maintenance of stable conditions during the entire measuring period is of course greatly facilitated by the fact that the measuring period is very short. Directly before and, if desired, after the four-way valve 13 is switched to the position in which the gas in the chamber 3 is passed through the gas chromatograph, the latter may be calibrated by means of the valve 19 which permits transfer of a certain volume of the test gas from the pipe 5 to the carrier gas supply pipe 14 ahead of the gas chromatograph 17. The way in which a small amount of gas is transferred from one pipe to the other will be explained more closely, reference being had to FIGS. 2 and 3 showing the valve 19 in more detail.

The dosing valve 19 is mainly composed of a disc 20 which is rotatably mounted between two Teflon sealing rings 21, one sealing ring being carried by a member 22 and the other by a member 23, the said members being resiliently forced together by for example disc springs 24 and together constituting a valve housing. In each of two planes comprising the axis of the disc 20 and defining an angle of 60° with each other, there is provided an angular passage in the members 22 and 23. Only one of the passages 25 is illustrated in FIG. 2. The passages also extend through the sealing rings 21. Each of the two passages is inserted in or connected into one of the supply pipes, the passage 25 being connected into the carrier gas supply pipe 14 and the other passage into the test gas supply pipe 5. In the disc 20 there are provided apertures 26–29 which are angularly spaced by 60° and which all have their centres on the circumference of a circle 30 about the rotational axis of the disc. The apertures 26 are positioned at angular distances of 120° and may have a diameter of for example 3 mm. The apertures 27, 28 and 29 may have a suitable diameter compared to the thickness of the disc 20 to provide a volume of the apertures corresponding to certain desired gas volumes which it is desired to transfer to the carrier gas supply pipe. Thus, the aperture 27 may for example have a volume of 1.5 $\mu$l., the aperture 28 a volume of 5 $\mu$l. and the aperture 29 a volume of 20 $\mu$l.

In ordinary operation the disc 20 of the dosing valve 19 may be in a position in which one of the apertures 27, 28 or 29 is aligned with the passage connected into the test gas supply pipe 5, whereas one of the apertures 26 is aligned with the passage 25, whereby gas may flow freely and independently through both the pipes 5 and 14. For calibration of the gas chromatograph the disc 20 may be rotated 60° by a handle (not shown) on the shaft 31 on which the disc 20 is non-rotatably mounted, whereby the amount of test gas present in that aperture 27, 28 or 29 which is connected into the test gas supply pipe 5 is transferred to the carrier gas supply pipe 14. In order to facilitate a correct operation of the dosing valve 19, said valve may be provided with suitable stops ensuring that the apertures will be in alignment with the respective passages in the end positions of the handle on the shaft 31.

The upper half 1a of the cell 1 is provided with a bimetallic feeler contacting the film surface to measure the temperature of the film in the cell. The feeler may be connected to a measuring instrument through a contact on the outside. The carrier gas supply pipe is adapted to be easily connected to the gas chromatograph by means of pipe joints and also to be connected in series with several test cells mutually connected in parallel.

The test cell with valves may be mounted on a frame and positioned within a relatively small thermostatically controlled cabinet, for instance with the dimensions 550 x 450 x 300 mm. The valves may be operated from the outside through a transparent front plate. The gas washers are placed at the back of the cabinet where also the pump 11 may be positioned.

The most important advantages of the apparatus and the method according to the invention are summarized as follows:

(1) The permeability characteristics are measured under isostatic conditions by determining the gas concentration.

(2) There may be used a gas chromatographic determination of the kind and the amount of simultaneously permeated gases and vapors, in which determination small analysed amounts are sufficient and the results are quickly obtained.

(3) Calibration values for small known volumes, that is 1.5, 5 and 20 $\mu$l., of the test gases may be established immediately before and after the measurements, whereby errors due to changes of the conditions in the gas chromatograph are avoided.

(4) The measuring period is very short (1 to 30 minutes).

(5) The results are very accurate (standard deviation 1.5%).

(6) The humidity of the gases on each side of the film may be controlled.

(7) Samples of organic vapors may be pumped in a closed circuit through a gas washer containing the test liquors and then through the calibrating valve and above the film back to the gas washer.

(8) Liquids may be circulated in the same way to supply gases and vapors to the test film.

(9) The measuring unit may be conditioned in a small cabinet and the dimensions of a complete unit makes it easily movable.

(10) The operation of the apparatus is extremely simple (the mounting of the film sample takes altogether 3 to 5 minutes and each analysis merely requires two manipulations).

(11) Several test cells may be connected in parallel and sequentially connected to the same gas chromatograph.

What I claim is:

1. An apparatus for measuring the gas and vapor permeability of films, comprising a test cell divided by the film into a first chamber containing test gas and a second chamber originally containing another gas, a conduit for supplying a carrier gas to a gas chromatograph, and a switch valve interposed in the carrier gas supply conduit and adapted selectively either to short-circuit said supply conduit to provide a continuous supply of carrier gas to the gas chromatograph or to connect the entire second chamber in series into said supply conduit to provide for a flushing of said second chamber and carrying of the gas therein to the gas chromatograph, the said valve when short-circuiting the carrier gas supply conduit also short-circuits conduits connecting the second chamber with the valve, whereby the latter conduits together with the second chamber will provide a closed loop in which the gas in the second chamber may circulate, the apparatus also comprising a gas humidifier which may be selectively connected into the loop.

2. An apparatus for measuring the gas and vapor permeability of films, comprising a test cell divided by the film into a first chamber containing test gas and a second chamber originally containing another gas, means for transferring gas from the second chamber into a conduit for supplying a carrier gas to a gas chromatograph, and a dosing valve connected into both the carrier gas supply conduit and a test gas conduit, said dosing valve being capable of transferring a certain amount of test gas from said test gas conduit into said carrier gas supply conduit to calibrate the gas chromatograph.

3. An apparatus according to claim 2 in which a switch valve is provided which is interposed in the carrier gas supply conduit and is adapted selectively either to short-circuit said supply conduit to provide a continuous supply of carrier gas to the gas chromatograph or to connect the entire second chamber in series into said supply conduit to provide for a flushing of said second chamber and a carrying of the gas therein to the gas chromatograph.

4. An apparatus according to claim 2, in which the dosing valve comprises a valve element having a duct of a defined volume and being movable from a position in which said duct is filled with test gas from said test gas conduit into a position in which the amount of test gas enclosed in the duct is passed into the carrier gas supply conduit.

5. An apparatus according to claim 2, in which the dosing valve comprises two passages connected into said carrier gas conduit and said test gas conduit respectively, and a valve element being composed by a disc extending across both passages and having an aperture which can be aligned with the passage in the test gas conduit so that the gas flowing in this conduit will pass through said aperture, said disc being displaceable between seals for aligning the aperture with the other passage whereby the gas contained in the aperture is transferrd from said test gas conduit to said carrier gas supply conduit.

6. An apparatus according to claim 2 in which the dosing valve comprises two passages connected into said carrier gas conduit and said test gas conduit respectively, and a valve element composed by a disc extending across both passages and having a plurality of apertures of different volumes, said apertures being adapted selectively to be aligned with the passage in the test gas conduit so that the gas flowing in this conduit will pass through the selected aperture, said disc being displaceable between seals for aligning the selected aperture with the other passage. whereby the gas contained in the aperture is transferred from said test gas conduit to said carrier gas supply conduit.

7. An apparatus according to claim 2, in which the dosing valve is capable of selectively transferring dfferent amounts of test gas into said carrier gas supply conduit to permit calibration of the gas chromatograph with an amount of test gas selected in accordance with the expected amount of diffused gas to be determined.

8. An apparatus according to claim 2 in which a switch valve is provided which is interposed in the carrier gas supply conduit and is adapted selectively either to short circuit said supply conduit to provide a continuous supply of carrier gas to the gas chromatograph or to connect the entire second chamber in series into said supply conduit to provide for a flushing of said second chamber and a carrying of the gas therein to the gas chromatograph, and in which the second chamber has a narrow and elongated shape and an inlet and an outlet positioned at the respective ends of the chamber to insure a rapid and quantitative flushing thereof when connected in series into the carrier gas supply conduit.

9. An apparatus according to claim 2 in which a switch valve is provided which is interposed in the carrier gas supply conduit and is adapted selectively either to short circuit said supply conduit to provide a continuous supply of carrier gas to the gas chromatograph or to connect the entire second chamber in series into said supply conduit to provide for a flushing of said second chamber and a carrying of the gas therein to the gas chromatograph, and which the said switch valve when short-circuiting the carrier gas supply conduit also short-circuits the conduits connecting the second chamber with the valve, whereby the latter conduits together with the second chamber will provide a closed loop in which the gas in the second chamber may circulate.

10. An apparatus according to claim 2 in which a switch valve is provided which is interposed in the carrier gas supply conduit and is adapted selectively either to short circuit said supply conduit to provide a continuous supply of carrier gas to the gas chromatograph or to connect the entire second chamber in series into said supply conduit to provide for a flushing of said second chamber and a carrying of the gas therein to the gas chromatogaph, and in which the said switch valve when short-circuiting the carrier gas supply conduit also short-circuits the conduits connecting the second chamber with the valve, whereby the latter conduits together with the second chamber will provide a closed loop in which the gas in the second chamber may circulate, and in which a gas humidifier is provided which may selectively be connected into the loop.

11. An apparatus for measuring the gas and vapor permeability of films, comprising a test cell divided by the film into a first chamber containing test gas and a second chamber originally containing another gas, a conduit for supplying a carrier gas to a gas chromatograph, and a switch valve interposed in the carrier gas supply conduit and adapted selectively either to short-circuit said supply conduit to provide a continuous supply of carrier gas to the gas chromatograph or to connect the entire second chamber in series into said supply conduit to provide for a flushing of said second chamber and carrying of the gas therein to the gas chromatograph, the second chamber having a narrow and elongated shape and an inlet and an outlet positioned at the respective ends of the chamber to insure a rapid and quantitative flushing thereof when connected in series into the carrier gas supply conduit.

References Cited

UNITED STATES PATENTS 3,251,217    5/1966    Evens et al. _____ 73—19
3,301,043    1/1967    Lyssy _____ 73—38

OTHER REFERENCES

Nogare & Juvet, Gas Liquid Chromatography, New York, Interscience, 1965, pp. 256 and 257.

LOUIS R. PRINCE, Primary Examiner

W. A. HENRY II, Assistant Examiner

U.S. Cl. X.R.

73—23.1